May 9, 1967  E. M. KEEN ETAL  3,318,441
MANURE CONVEYOR SYSTEM FOR POULTRY HOUSES AND THE LIKE
Filed Oct. 21, 1965  2 Sheets-Sheet 1
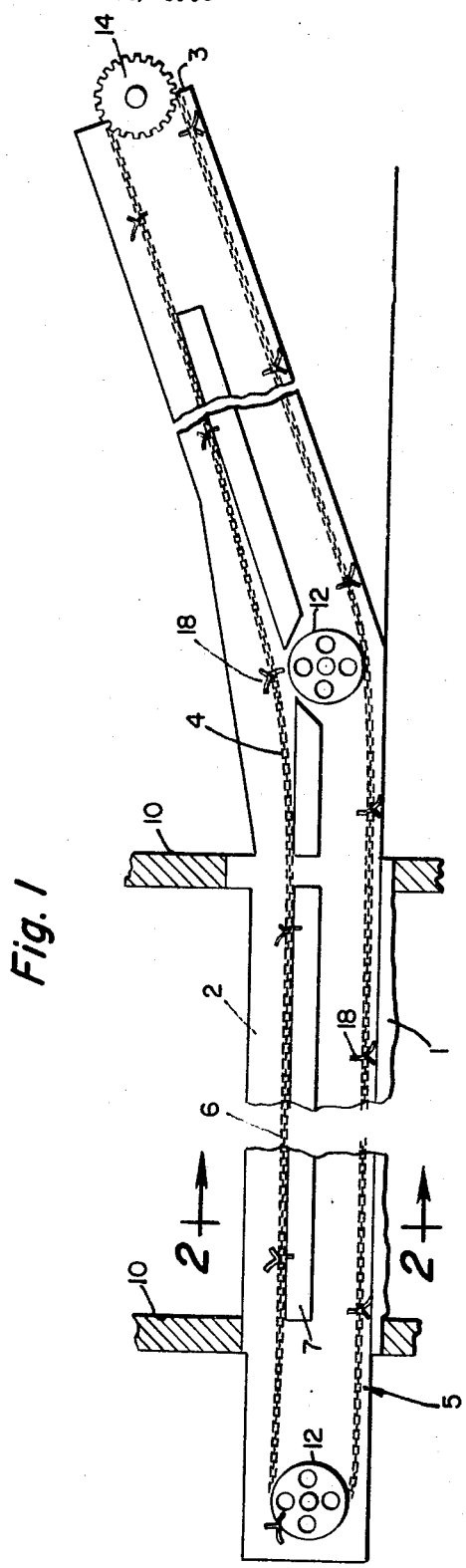
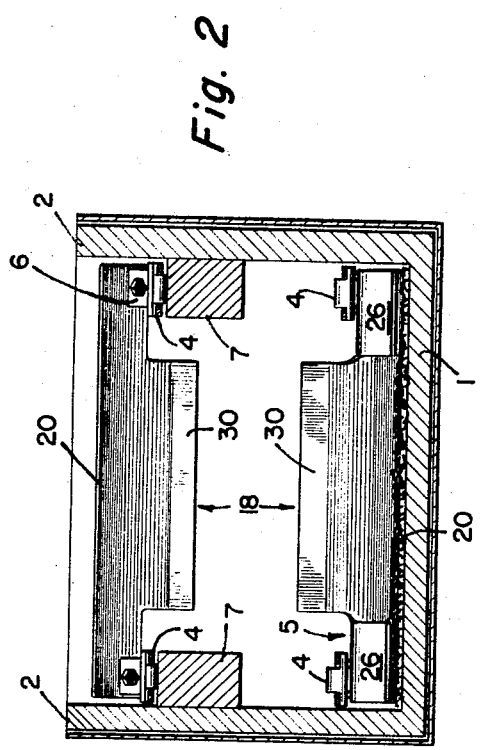
INVENTORS
EVERETT M. KEEN
ANTHONY J. SICILIANO
BY
ATTORNEY May 9, 1967  E. M. KEEN ET AL  3,318,441
MANURE CONVEYOR SYSTEM FOR POULTRY HOUSES AND THE LIKE
Filed Oct. 21, 1965  2 Sheets-Sheet 2
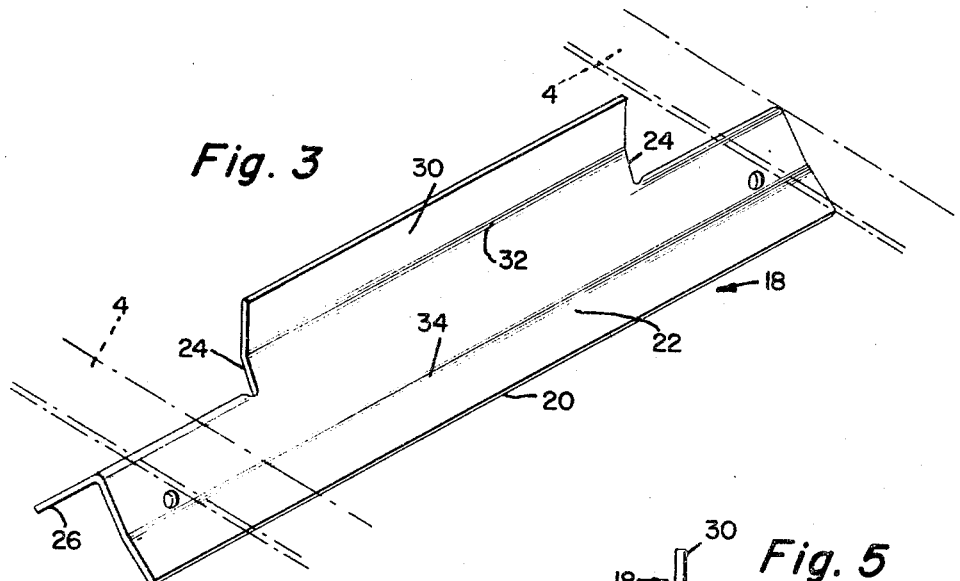
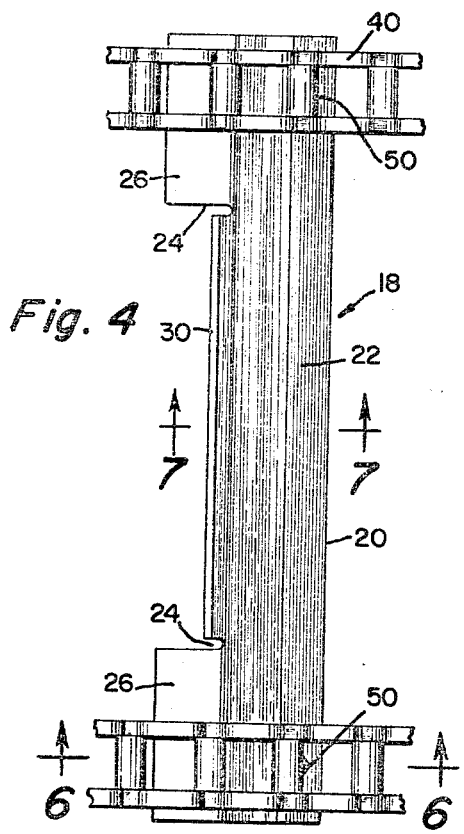
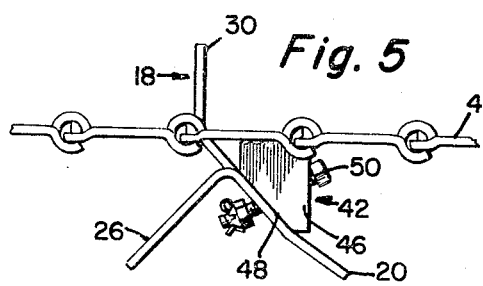
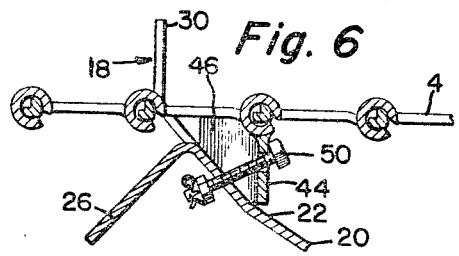
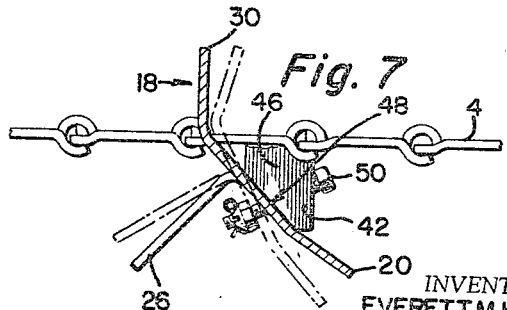
INVENTORS
EVERETT M. KEEN
ANTHONY J. SICILIANO
BY *Albert H. Kirchner*
ATTORNEY

United States Patent Office 3,318,441
Patented May 9, 1967

3,318,441
MANURE CONVEYOR SYSTEM FOR POULTRY HOUSES AND THE LIKE
Everett M. Keen and Anthony J. Siciliano, Millville, N.J., assignors to Keen Manufacturing Corporation, Millville, N.J., a corporation of New Jersey
Filed Oct. 21, 1965, Ser. No. 499,958
5 Claims. (Cl. 198—175)

The present invention relates to conveyors, and more particularly to an endless type trough conveyor and to the pusher or flight elements thereof, their mode of connection to the endless pulling means, and their manner of cooperation with the stationary trough structure of the conveyor and the manner of their action on the material being conveyed therein.

More specifically, the invention is primarily adapted to be embodied in a conveyor system for removing poultry manure accumulated as droppings from the cages of an egg laying battery installation or equivalent structure. Accordingly, the details of the preferred embodiment, and the manner in which that construction, selected to illustrate the invention in the following specification and accompanying drawings, overcomes certain difficulties and solves a number of problems of the best known prior art structures will be evident from a consideration of the new arrangement incorporated in a poultry manure conveyor, but the new inventive principles are regarded as of broad application and hence are not to be limited necessarily to this specific use.

In modern large scale installations of poultry husbandry, including particularly the raising of chickens as broilers and for the production of eggs, the birds are kept in batteries of wire cages having open mesh floors through which the birds' droppings fall into a subjacent trough. The trough contains a conveyor system that is operated periodically or at intervals from time to time to scape the droppings loose from the trough floor and move them along to a discharge point at the tail end of the conveyor. A convenient and preferred form of conveyor comprises a pair of sprocket-driven endless chains trained along the two sides of the trough and connected by a series of equally spaced flights or pusher elements which span the trough and are pulled along it by the chains and which scrape the floor of the trough and thus clear it of the droppings, which are pushed along the trough to the tail end, commonly elevated above the general level of the installation for discharge into a haul-away truck or other receptacle.

Difficulty has been experienced because of the inherent stickiness of the fresh droppings, which causes the manure to adhere tenaciously to the floor of the trough.

Attempts to design flight elements that would efficiently scrape the droppings clear of the trough floor and leave the latter clean and clear have generally been unsuccessful because the best, sharpest and heaviest of the flight elements heretofore used have unfortunately to a great extent served only to press or mash a layer of the droppings down onto the trough floor, by a sort of "troweling" action. And this action tended to be continued and duplicated upon repeated traverses of the flights, so that the build up of pressed down layers in a short time amounted to a considerable thickness of hardened deposit requiring hard manual labor for its removal.

A principal object of the present invention is to provide a scraper flight element, and a mode of connection to and cooperation with the operating chains of the conveyor, that will solve the foregoing problem by functioning unfailingly to scrape the trough floor clean of adhering manure on each first traversing encounter with it or, in other words, to eliminate the troweling action of the prior art flights.

The preferred embodiment of the invention is depicted in the accompanying drawings in which FIGURE 1 is a longitudinal vertical cross section through a typical manure collecting trough provided with a conveyor system in accordance with the principles of the present invention;

FIG. 2 is a vertical transverse cross section taken on the line 2—2 of FIG. 1;

FIG. 3 is a perspective view of one of the scraper flight elements in operative position;

FIG. 4 is a top plan view of one of the scraper flight elements, shown connected to the conveyor chains that propel it;

FIG. 5 is a side elevational detail view of the scraper flight and chain combination shown in FIG. 4;

FIG. 6 is a longitudinal cross sectional view (transverse of the scraper flight) taken on the line 6—6 of FIG. 4, showing the flight in position of rest; and FIG. 7 is a similar view taken on the line 7—7 of FIG. 4 showing in broken lines the position of the flight in operative, pulled position scraping the trough floor.

In the drawings, FIG. 1 and 2 show diagrammatically a trough of generally rectangular cross section, including a floor 1 and a pair of side walls 2, of appropriate width and length to be disposed beneath a battery of poultry cages to receive the droppings that fall through the wire mesh floors of the cages. The trough is best made of suitable wood planks, and the floor is desirably made smooth and flat.

The trough contains a conveyor system and it is with this that the present invention is particularly concerned. The system includes sprocket driven endless chain means that pull flights in the form of scraper blades along the floor to push the accumulated droppings before the blades, along the trough, in a direction which may be considered to be from left to right in FIG. 1, to a discharge point at the tail end of the trough, which is preferably somewhat elevated as shown at 3 in FIG. 1, so that a collection vehicle can be disposed beneath it. The chains are shown at 4, 4, and are two in number, one at each side of the trough, along one of the side walls. The operative run of the pair of chains, designated 5, is along the trough floor, and the return run, designated 6, is elevated well above the floor, by ledges 7 in the form of stout wooden ways which may be made of conventional 2 x 4's bolted to the inner surfaces of the trough side walls.

The trough may be supported and mounted in any convenient manner, as by the spaced uprights 10 in FIG. 1.

The chains are meshed with idler sprockets 12, 12 sufficient in number to maintain them in proper relation and position when moved along the trough by a power driven sprocket 14, preferably journaled in bearings at the discharge end of the system. It will be understood that each of the sprockets shown in FIG. 1 is one of a pair, both mounted on a common shaft, one sprocket for each chain, so that the two chains move in unison and maintain a constant side by side relation.

The chains have a series of conveyor flights secured to them in the equidistantly spaced relation shown in FIG. 1. Each of these flights is a blade 18 made of heavy steel plate stock, preferably of the order of one-eighth inch in thickness, cut and stamped or otherwise formed into the shape best shown in the perspective view of FIG. 3. As there seen, and as shown in FIG. 2, the blade has a length substantially equal to the width of the trough floor. It comprises an originally oblong plate. One of the longitudinal edges of this original blank constitutes the scraping edge 20 that forms the lower front end of the main body portion 22 of the blade. The other longitudinal edge of the original blank is cut transversely about half way down into the body, somewhat less than one-quarter of the distance in from each end of the blank (some three or four inches in from the ends of a 16 inch blade) as shown at 24, and the tabs thus formed at the two ends of the blade are bent down at about a right angle to provide a pair of feet or legs 26 which make an angle of inverted V-shape with the blade body 22 and serve to dispose the body at a forwardly and downwardly sloping inclination when the blade rests on the trough bottom as will be evident from FIGS. 1, 2 and 3. In this position the scraping edge 20 of the blade is engaged with the trough floor, making good contact with it all across the floor width. The blade main body portion 22 slopes rearwardly and upwardly as shown, and includes a central high portion 30 between the end legs 26. The blade may advantageously have incorporated in it a slight bend, shown at 32 to make the upper zone of the central portion 30 substantially vertical when the blade rests on the trough floor, and similarly another slight bend may be introduced at 34 to make the edge 20 of the blade engage the trough floor at a smaller angle than that at which the legs 26 meet the floor.

It will be evident that, with the ends of the blades attached to the chains, and with the chains pulled along the trough, the blades are intended to be moved in scraping relation to the trough floor so as to remove adherent manure therefrom and propel it along the trough to the discharge end 3.

However, it is here that difficulty has been encountered in the operation of the prior art blades. Poultry manure, particularly when fresh and devoid of litter content as in the case of droppings falling through the wire mesh floors of cage batteries, has a very sticky consistency and tends to adhere tenaciously to the conveyor floor. The best prior art blades known to us have compounded the difficulty by exerting a sort of "troweling" effect on the soft material. That is to say, the leading edges of the blades would not scrape the floor clean at all but would tend to ride over the droppings and mash them down into a compact layer firmly adhered to the floor. Repeated traverses of these blades would build up layer upon layer in the trough, so that the system would soon break down and the floor would have to be laboriously cleaned by manually operated scraping tools.

The present invention overcomes this difficulty by the shape of the new scraper blades in combination with a new manner of connecting the blades to the chains, the combined effect of which is to pull the blades down into forcible scraping engagement with the trough floor. That is to say, the pulling force applied to the blades by the chains functions not only to move the blades along the trough and thus carry loose manure in front of the body portion 22 of each blade but serves also to dig the front edge 20 of each blade down into manure adhering to the floor so as forcibly to scrape it loose.

The connection of each blade to the two chains and the manner in which the blade moves to dig into the manure on the trough floor are shown by FIGS. 5, 6 and 7. The important feature of this connection is a degree of looseness by which tension on the chains serves to tilt the blade from its position of rest, shown in full lines in FIG. 7, into a position making the greater angle with the floor which is shown in broken lines in the figure, when the blade is pulled along the floor, so that the pulling force tends to push the blade down into manure sticking to the floor rather than simply to pull the blade over it.

The connection which we prefer to use for accomplishing this result comprises selection of a chain having links 40 of the rectangular shape shown in FIG. 4. To selected links of such shape abutments 42 are welded. Each of these abutments comprises a body of stout metal plate stock stamped or bent to provide a front wall 44 and two rearwardly directed wings or side walls 46, each of which has a downwardly and forwardly sloping lower rear edge 48. The top edges of the front wall 44 and of the two side wings 46 are welded to one of the links 40, and the angle that the lower rear edges 48 of the abutment make with the plane of the link is substantially the same as the angle made with the link by the body portion 22 of the blade when the parts are at rest. However, the lower rear edges of the abutment are not secured to the blade but are held loosely against it by a headed pin connection, such as the bolt 50, which stands through holes in the front wall 44 of the abutment and in the body portion of the blade, with such a degree of play or looseness, as shown in FIGS. 5, 6 and 7, that the blade is free to tilt, as indicated by the broken lines of FIG. 7, when pulling force is applied to it by tension of the chain.

Assisting in producing this tilting action is the location of the holes in the members through which the bolt 50 extends. The hole in the body portion of the blade is relatively high up on the blade, so that the blade tends to turn clockwise as viewed in FIGS. 5, 6 and 7 when pulled at this point. This lifts the rear leg 26 from engagement with the trough floor and turns the front edge 20 down firmly into engagement with the floor, i.e., into the desired forcible scraping action thereon.

This tilted position of the blade while being pulled along its operative lower run is seen in FIG. 2. This figure shows also the position of the blades and the chains in the upper, return run, where the chains are seen riding along the ledges 7 and the blades are inverted, with the scraping edges 20 uppermost.

It is believed to be evident from the foregoing description of the illustrated preferred embodiment that the invention accomplishes the objectives set out hereinabove. It is to be understood that the inventive principles may be embodied in other and further modified forms all of which are to be deemed within the scope and purview of the appended claims.

We claim:

1. A manure conveyor system for poultry houses and the like comprising a trough having a substantially smooth flat floor adapted to receive droppings, a pair of endless chains disposed in parallelism along the opposite sides of the trough, a series of substantially equally spaced scraper flights disposed transversely of the trough each comprising a blade having a front edge resting on the floor of the trough and extending substantially entirely across said floor, and means at the opposite ends of each blade loosely connecting the blade to a selected pair of the links of the chain with freedom for tilting movement of the blade to press said front edge thereof down into scraping engagement with the floor when the chains are moved to pull the blades along the trough.

2. A manure conveyor system as claimed in claim 1 in which the trough is provided with side walls having narrow ledges located over the side margins of the floor of the trough, and sprocket means pulling the chains with the operative runs thereof maintaining the blades in scraping engagement with the floor of the trough and with the return runs thereof riding on said ledges and maintaining the blades inverted above the floor.

3. A manure conveyor system as claimed in claim 1 in which each blade has a substantially flat front body portion of substantially the full length of the blade and substantially right angularly directed end portions cooperating with the body portion to provide legs normally holding the body portion inclined downwardly and forwardly toward the trough floor at an oblique angle, and in which the means connecting the blades to the links of the chain comprise loose joints producing a downward thrust on said front edge of each blade when the chains are moved to pull the blades along the trough.

4. A manure conveyor system as claimed in claim 3 in which the links of the chains are of substantially rectangular shape and the connecting means for the blades comprise abutments rigidly depending from selected links and having inclined lower rear edges normally resting flat against the front surfaces of the blades and being loosely connected to the blades so that when the chains are moved to pull the blades the abutments will tilt and pull the blades to bring the front edges thereof down into scraping engagement with the floor of the trough.

5. A manure conveyor system for poultry houses and the like comprising a trough having a substantially smooth flat floor adapted to receive droppings, a pair of endless chains disposed in parallelism along the opposite sides of the trough, a series of substantially equally spaced scraper flights disposed transversely of the trough each comprising a blade having a front edge resting on the floor of the trough and extending substantially entirely across said floor, each blade having a substantially flat front body portion of substantially the full length of the blade and substantially right angularly directed end portions cooperating with the body portion to provide legs normally holding the body portion inclined downwardly and forwardly toward the trough floor at an oblique angle, and means connecting the blades to the links of the chain comprising loose joints producing a downward thrust on the front edge of each blade when the chains are moved to pull the blades along the trough, said links of the chain being of substantially rectangular shape, and the connecting means for the blades comprising abutments welded to selected links and depending rigidly therefrom, each abutment having a front wall and two side wings extending rearwardly from the opposite sides of said front wall, each side wing terminating in an inclined lower rear edge, and headed pin means extending through the abutment front wall and the upper part of said body portion and holding said inclined lower rear edge of the abutment loosely against the sloping front surface of the body portion of the blade with sufficient play to cause tilting of the abutment and body portion when the chains are moved to pull the blades along the trough.

References Cited by the Examiner

UNITED STATES PATENTS

| 1,587,076 | 6/1926 | Johnson | 198—174 |
| 1,726,065 | 8/1929 | Greenleaf | 198—175 |
| 2,646,157 | 7/1953 | Belt. | |

FOREIGN PATENTS 415,063    8/1934    Great Britain.

EVON C. BLUNK, *Primary Examiner.*

M. L. AJEMAN, *Assistant Examiner.*